United States Patent Office.

EUGEN FELIX GEORG HARTMANN, OF BERLIN, ASSIGNOR TO GEBR. STOLL-WERCK, OF COLOGNE, GERMANY.

SOLUBLE COCOA.

SPECIFICATION forming part of Letters Patent No. 270,878, dated January 16, 1883.

Application filed October 17, 1882. (No specimens.)

*To all whom it may concern:*

Be it known that I, EUGEN FELIX GEORG HARTMANN, of the city of Berlin, in the Kingdom of Prussia and German Empire, have invented certain new and useful Improvements in the Process of Manufacturing Cocoa, of which the following is a specification.

The object of my invention is to manufacture an easily-soluble product of cocoa by a new process, the advantage of which above the different processes heretofore employed consists in the production of an article which is more readily soluble, and at the same time free from influences injurious to health, due to certain ways of treatment.

In order to render my improved process more readily understood, I shall first refer to the different processes heretofore generally employed in the manufacture of cocoa, which are as follows: The cocoa-beans, after being roasted and their hulls being removed, were ground at a temperature of 140° to 180° Fahrenheit, and then, while yet warm and soft, were put into bags of strong cloth and subjected to hydraulic pressure to remove from them the greater part of their oleaginous matter, the press used for the purpose being so constructed that it allowed of being heated. The remaining mass, which was then free from the greater part of its oil, was thereupon taken out of the bags and pulverized. Another process—generally known by the name of the "Dutch" process—consists in treating the mass, after being ground, with a solution of soda or potash or both of the said alkalies. The object of this treatment was to render the cocoa-powder more readily soluble; but it presents the disadvantage of changing the greater part of the oleaginous matter contained therein into soap, thereby greatly injuring its taste and flavor. As only about one-half of the forty per cent. of oleaginous matter originally contained in the mass can be removed by pressure, it is evident that a considerable percentage of the alkali must remain in the same. Thus the desired object for which the oleaginous matter is removed—said object being the production of an easily-digestible and palatable food for small children and convalescents—is not attained, since the most renowned medical authorities have pronounced such presence of soda and potash (of which the mass still contains as much as three to five per cent.) as absolutely dangerous.

I shall now proceed to describe my improved process, which is free from the objections above mentioned, inasmuch as the article produced is more readily soluble and the original flavor of the cocoa-bean is retained in the same, the latter at the same time being free from all matter injurious to health.

After grinding the beans by means of any suitable mill generally used for the purpose, and pressing them, as described in the processes already mentioned, I add ten to twenty per cent. of hot or cold water to the remaining mass while yet in a warm state, and by means of kneading I thoroughly mix the latter with the water. I then allow the mass to dry quickly, and subsequently pulverize it. The water may also be added directly after the mass has left the mill, before being subjected to the action of hydraulic pressure, and then be pressed afterward. Another modification would be to first mix the ground mass with, say, five to ten per cent. of water; then by means of pressing to free it from part of its oleaginous substances, and then after the pressing to add to the remaining mass another five to ten per cent. of water, and to thoroughly mix the latter with the former by means of kneading, whereupon the mass is allowed to dry quickly, and subsequently pulverized. In the last-named two instances the quality of the article produced will not be affected with regard to its tendency to dissolve, but only with regard to its flavor and taste.

The powder produced by this improved process contains none but the pure substances of the original cocoa-bean, and is at the same time just as soluble, and even more so, than that produced by the well-known Dutch process. Besides such powder, a cocoa-powder not being freed from part of its oily substances may be produced by my improved process by stirring the ground mass with water, quickly drying, and subsequently pulverizing it. Both such powders possess the same degree of solubility, and can be dissolved by simply pouring on hot water, while the so-called insoluble cocoa products can be dissolved only by allowing them to boil for some time.

Having thus described my improved process, what I claim as new, and desire to secure by Letters Patent, is—

The herein-described process of preparing cocoa, consisting in grinding the beans, expressing as far as possible the oleaginous substances from the mass, adding water, and then drying the cocoa, the said steps in the preparation of the cocoa being conducted in substantially the order herein specified.

In testimony whereof I have signed my name to this specification in the presence of two subscribing witnesses.

EUGEN FELIX GEORG HARTMANN.

Witnesses:
B. ROI,
ROBERT R. SCHMIDT.